(12) United States Patent
Wien

(10) Patent No.: US 11,773,329 B2
(45) Date of Patent: Oct. 3, 2023

(54) MICROWAVE PYROLYSIS REACTO

(71) Applicant: Scanship AS, Tonsberg (NO)

(72) Inventor: Asgeir Wien, Vollen (NO)

(73) Assignee: Scanship AS, Tonsberg (NO)

( * ) Notice: Subject to any disclaimer, the term of this patent is extended or adjusted under 35 U.S.C. 154(b) by 64 days.

(21) Appl. No.: 17/265,208

(22) PCT Filed: Sep. 23, 2019

(86) PCT No.: PCT/EP2019/075470
§ 371 (c)(1),
(2) Date: Feb. 2, 2021

(87) PCT Pub. No.: WO2020/064598
PCT Pub. Date: Apr. 2, 2020

(65) Prior Publication Data
US 2021/0301208 A1    Sep. 30, 2021

(30) Foreign Application Priority Data

Sep. 26, 2018 (NO) .................................. 20181257

(51) Int. Cl.
*C10B 1/04* (2006.01)
*C10B 49/00* (2006.01)
(Continued)

(52) U.S. Cl.
CPC ............. *C10B 19/00* (2013.01); *B01J 19/126* (2013.01); *C10B 1/04* (2013.01); *C10B 29/04* (2013.01);
(Continued)

(58) Field of Classification Search
None
See application file for complete search history.

(56) References Cited

U.S. PATENT DOCUMENTS

| 4,193,855 | A |   | 3/1980  | Tuccio    |           |
|-----------|---|---|---------|-----------|-----------|
| 4,295,824 | A |   | 10/1981 | Wens      |           |
| 5,366,595 | A |   | 11/1994 | Padgett   |           |
| 5,720,232 | A | * | 2/1998  | Meador    | C10B 47/44|
|           |   |   |         |           | 110/109   |

(Continued)

FOREIGN PATENT DOCUMENTS

| CN | 101498291 Y | 8/2009 |
| CN | 102580650 Y | 7/2012 |

(Continued)

OTHER PUBLICATIONS

NO Search report dated Jul. 24, 2020, cited inter alia as statement of relevance for non-english refs cited therein.
Search Report from China Patent Office dated Nov. 1, 2021.

*Primary Examiner* — Jonathan Luke Pilcher
(74) *Attorney, Agent, or Firm* — Christian D. Abel

(57) ABSTRACT

The present invention provides a microwave pyrolysis reactor (1) comprising an inner pipe element (2) and a housing (4), wherein the inner pipe element (2) is made of a microwave transparent material and is arranged within the housing and comprises a first open end (5) and a second open end (6); the housing (4) comprises a first inner surface, enclosing an annular space (7,44) around the inner pipe element (2), a waste inlet (10), a solids outlet (11), a gas outlet (12), and a port (13) for a microwave waveguide (14), the waste inlet and the solids outlet are in communication with the first open end and the second open end of the inner pipe element, respectively, and the port for a microwave waveguide is in communication with the annular space; the inner pipe element, the waste inlet and the solids outlet of the housing form parts of a conduit not in fluid communication with the annular space around the inner pipe element and wherein the inner pipe element is clamped within the housing via a cylinder-shaped resilient assembly (54) arranged at at least one of the first open end (5) and the second open end of the inner pipe element, the resilient assembly is adapted to allow longitudinal expansion of the (Continued)

inner pipe element (2) and comprises a central through-going passage (57) having a centerline in line with a centerline (C) of the inner pipe element.

13 Claims, 11 Drawing Sheets

(51) Int. Cl.
    *C10B 19/00*     (2006.01)
    *B01J 19/12*     (2006.01)
    *C10B 29/04*     (2006.01)
    *C10B 53/02*     (2006.01)
    *C10B 53/07*     (2006.01)

(52) U.S. Cl.
    CPC .............. *C10B 49/00* (2013.01); *C10B 53/02* (2013.01); *C10B 53/07* (2013.01); *B01J 2219/00006* (2013.01); *B01J 2219/00141* (2013.01); *B01J 2219/00286* (2013.01)

(56) References Cited

U.S. PATENT DOCUMENTS

| | | | |
|---|---|---|---|
| 11,053,443 B2 * | 7/2021 | Wien | ............... C10B 53/00 |
| 11,248,184 B2 * | 2/2022 | Grainger | ................ C10L 3/08 |
| 2004/0179977 A1 | 9/2004 | Hargett, Jr. | |
| 2013/0302220 A1 | 11/2013 | Hargett, Jr. | |
| 2016/0348211 A1 | 12/2016 | Ugolin | |
| 2018/0142174 A1 * | 5/2018 | Grainger | ................ C10L 3/08 |
| 2019/0218361 A1 * | 7/2019 | Wang | ................ B29B 17/021 |
| 2020/0102502 A1 * | 4/2020 | Wien | ............... C10B 3/00 |
| 2021/0106970 A1 * | 4/2021 | Wien | ............... C10B 53/00 |

FOREIGN PATENT DOCUMENTS

| | | |
|---|---|---|
| CN | 102718383 A | 10/2012 |
| CN | 202465598 A | 10/2012 |
| CN | 104136111 A | 11/2014 |
| CN | 207877644 A | 9/2018 |
| GB | 702758 Y | 1/1954 |
| TW | 386052 A | 4/2000 |

\* cited by examiner

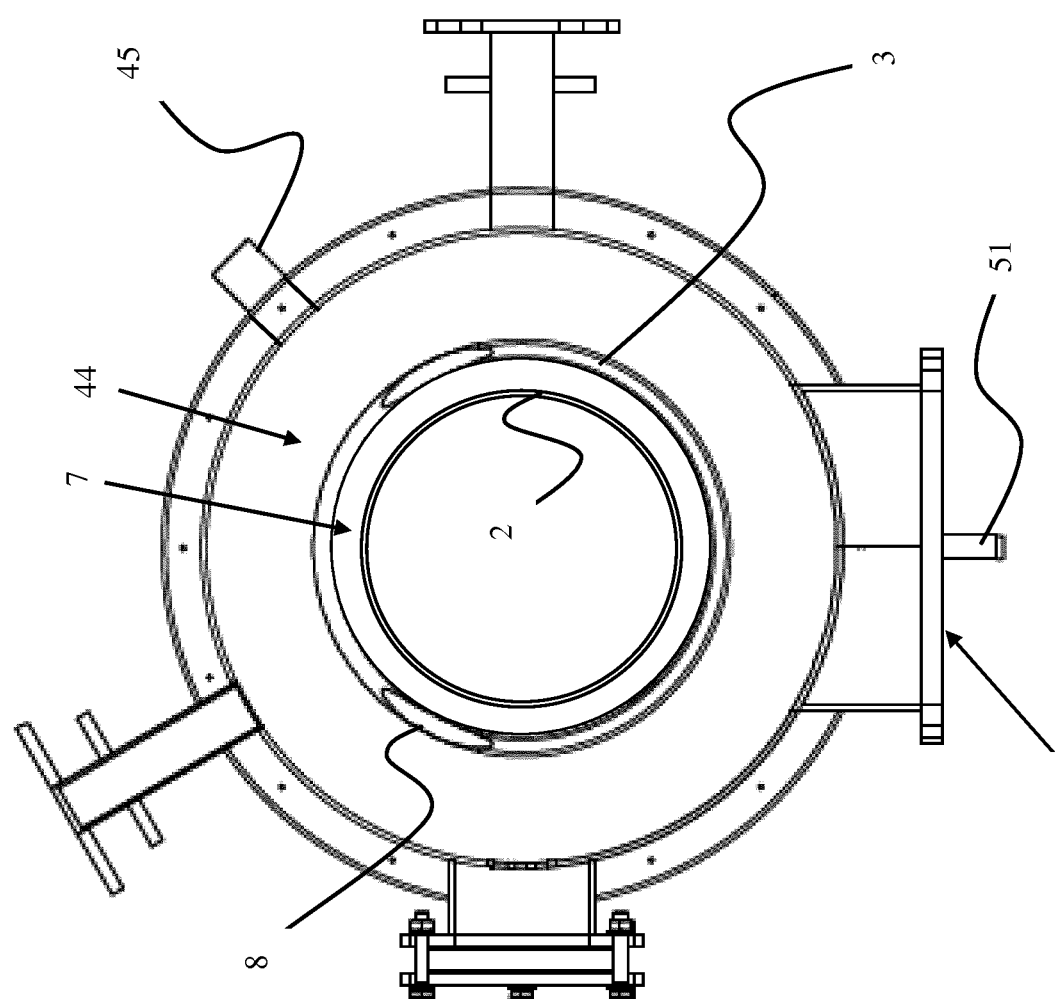
Fig. 4 (section B-B)

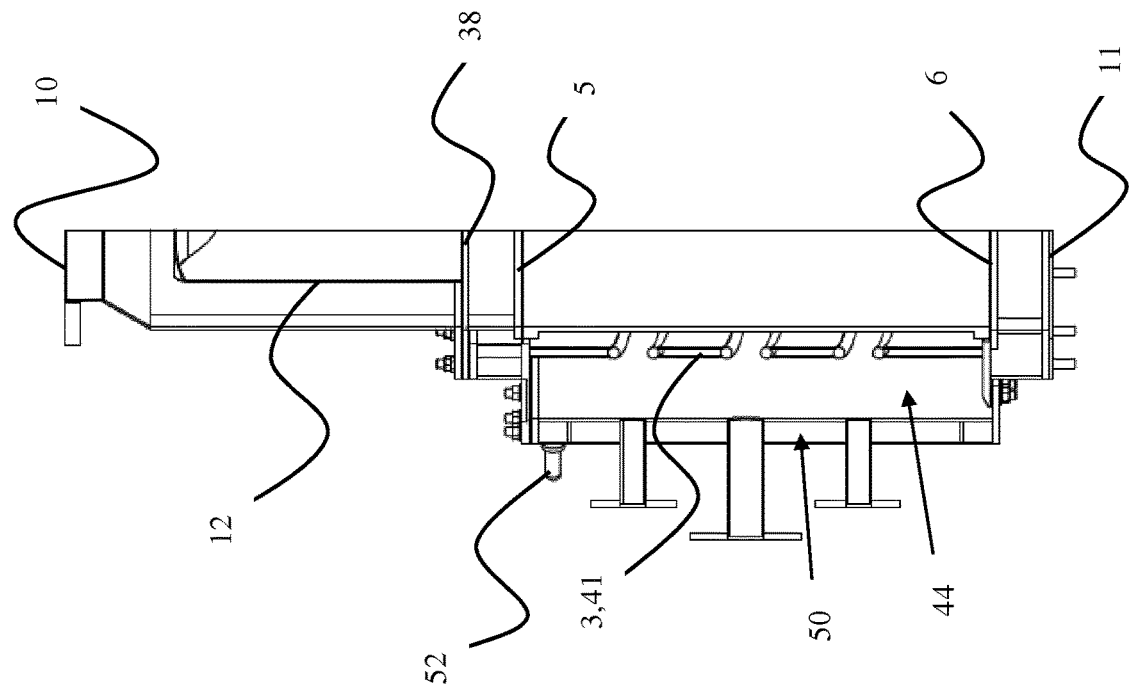
Fig. 6 (section A-A)
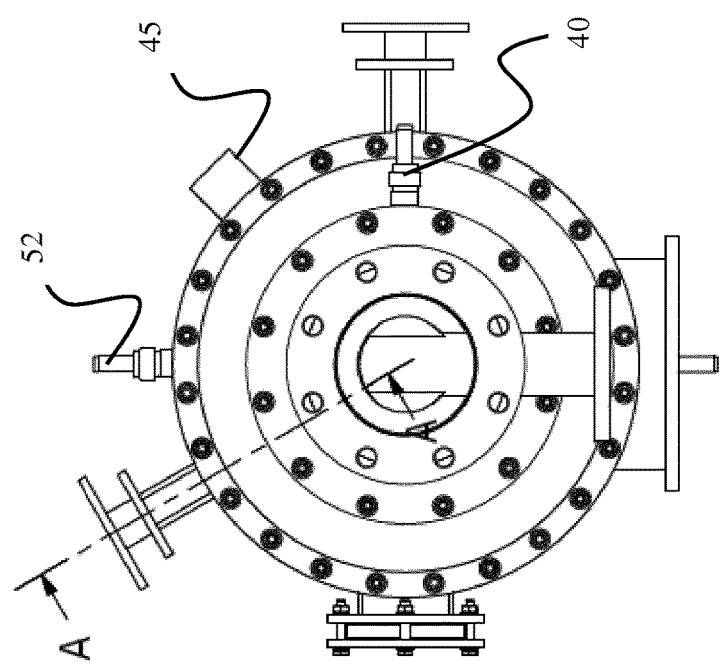
Fig. 5

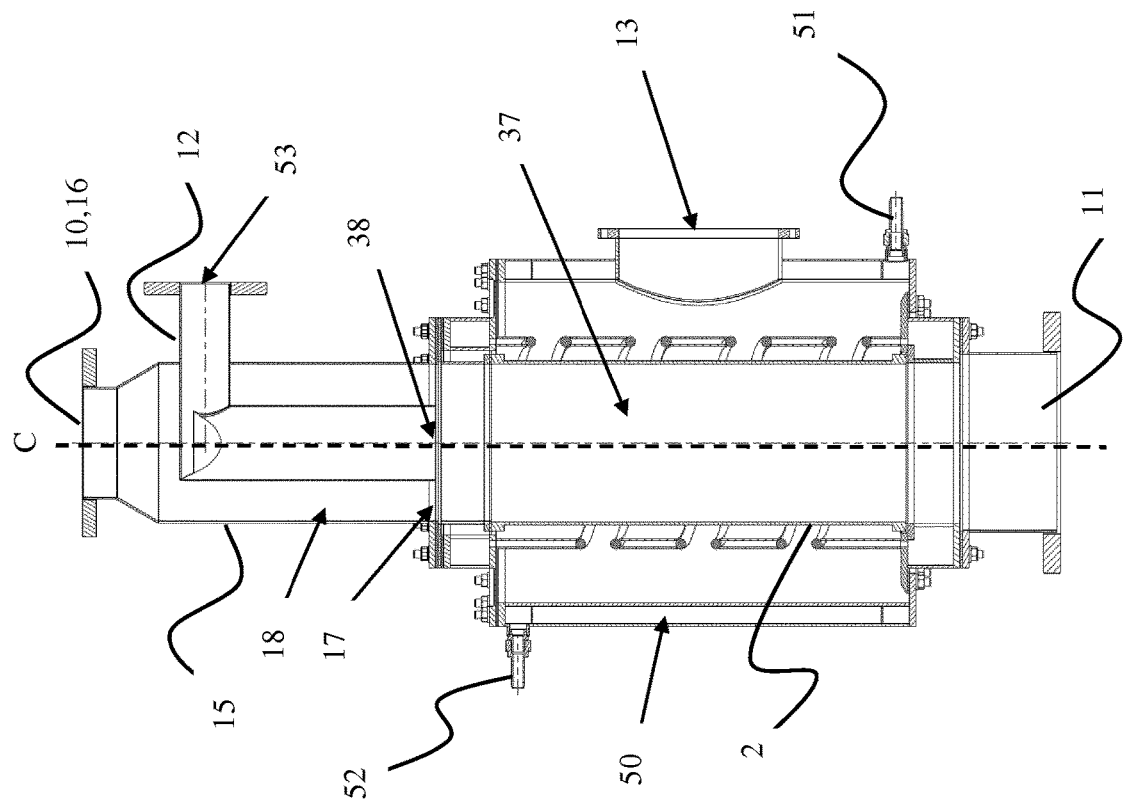
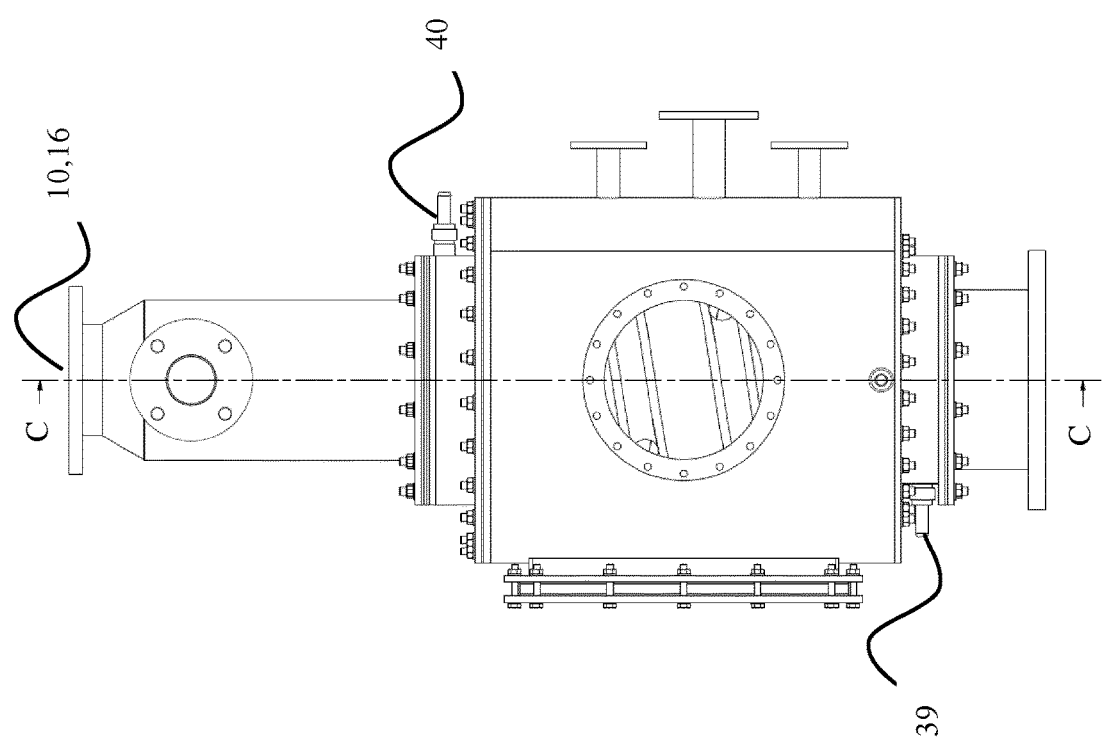

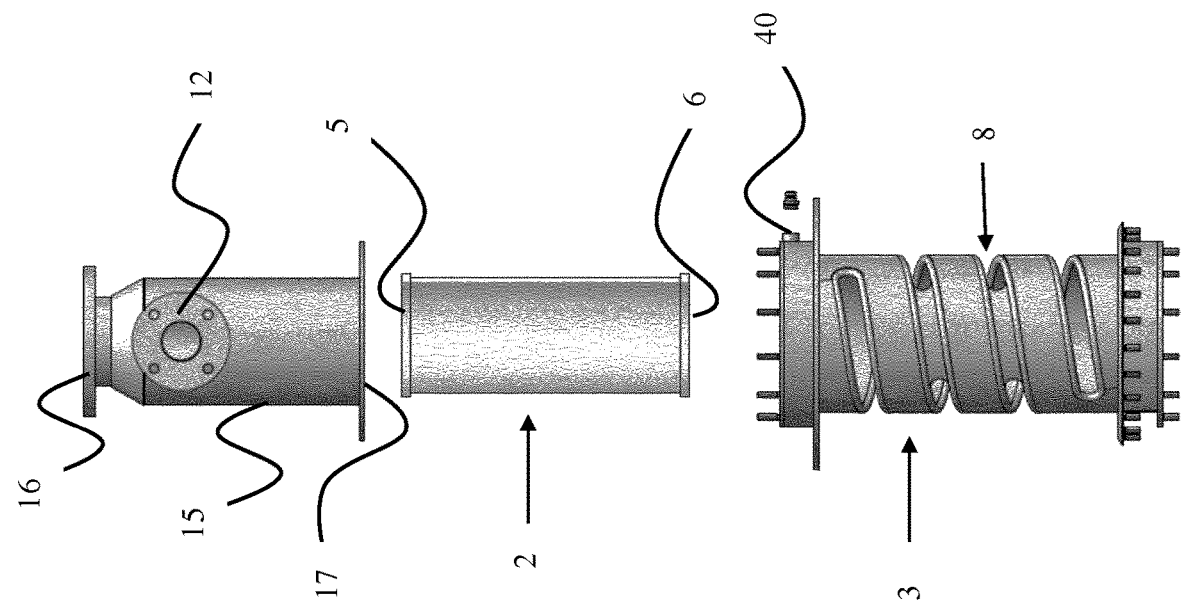
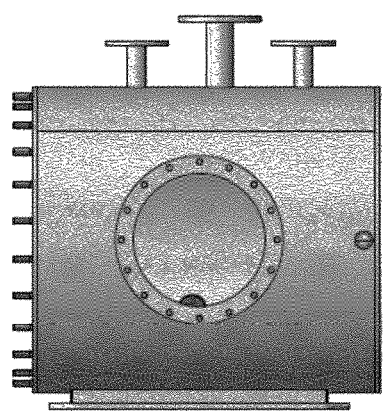
Fig. 9

Fig. 11 (detail A)

Fig. 12 (detail B)

MICROWAVE PYROLYSIS REACTO

TECHNICAL FIELD

The present invention relates to the field of microwave-assisted pyrolysis reactors, and more particularly to a microwave pyrolysis reactor for waste disposal, use of such a microwave pyrolysis reactor in a waste disposal system and the waste disposal system comprising the microwave pyrolysis reactor.

BACKGROUND

Waste disposal and management off-shore, for instance on ships, is commonly obtained by combining the use of incinerators, collection of waste such as cooking oil, oil sludge, paper, plastics, cardboard and wood pallets for subsequent weekly landing on-shore, as well as the discharge of sewage sludge and food waste to sea. Consequently, the environmental footprint is quite large, especially in areas where the shipping traffic is high. This is especially noticeable in connection with cruise ships, wherein certain ports and ocean regions have numerous legislations prohibiting discharge to sea, as well as flue gas emissions. The latter prohibition applies to ships at port, and thus restricts the use of on-ship incinerators. Many of the same problems and issues regarding waste disposal and management are found in rural areas, islands and similar sites where access to large-scale waste disposal facilities are restricted.

In addition to common incinerators, pyrolysis systems have also been used in waste disposal systems. Pyrolysis is a thermochemical decomposition of organic material at elevated temperatures in the absence of oxygen, and in these systems, the pyrolysis reaction is obtained by an internal plasma arc or an external heating. The advantage of using a pyrolysis reactor instead of an incinerator is the low environmental impact in terms of air pollution and discharge of residues. In addition to char, the pyrolysis reactor produces syngas and/or bio oil, which may be used for fueling a boiler and/or a gas turbine to produce energy as heat or electric power. Although the known waste disposal systems, using such pyrolysis reactors, are in many ways superior to the systems using incinerators, there still remains a large potential for improvement.

A recent and important development in the art of pyrolysis is the microwave-assisted pyrolysis reactor. In these reactors, microwaves are used to heat the material to be pyrolyzed.

Waste disposal systems using microwave pyrolysis reactors for microwave-assisted pyrolysis are known. Examples of such systems are disclosed in for instance U.S. Pat. Nos. 5,387,321 and 6,184,427 B1. The physical principles, effects and advantages of using microwave-assisted pyrolysis in waste disposal and waste to energy applications are reviewed by Lam et al. *Energies* 2012, 5, 4209-4232.

A microwave-assisted pyrolysis reactor is disclosed in CN 102580650 B. In CN 102580650 B the gas developed inside the reactor is allowed to exit the inner pipe element of the reactor via an outlet opening arranged in the sidewall of the reactor.

The goal of the present invention is to provide a microwave-assisted pyrolysis reactor suitable for microwave-assisted pyrolysis of various types of waste in waste disposal-, treatment and/or processing systems. The present invention provides a microwave pyrolysis reactor, which has a simple construction, is robust regarding the type and size distribution of waste being pyrolyzed and is not dependent on a complex solution for moving the waste to be pyrolyzed through the reactor. In particular, the present invention provides a reactor having an improved operational lifetime and shorter service intervals. A further aim of the invention is to alleviate or remove at least some of the disadvantages of the prior art microwave-assisted pyrolysis reactors and waste disposal systems.

SUMMARY OF THE INVENTION

The present invention is defined by the appended claims and in the following:

In a first aspect, the present invention provides a microwave pyrolysis reactor comprising an inner pipe element and a housing, wherein
  the inner pipe element is made of a microwave transparent material and is arranged within the housing and comprises a first open end and a second open end;
  the housing comprises a first inner surface, enclosing an annular space around the inner pipe element, a waste inlet, a solids outlet, a gas outlet, and a port for a microwave waveguide, the waste inlet and the solids outlet are in communication with the first open end and the second open end of the inner pipe element, respectively, and the port for a microwave waveguide is in communication with the annular space; and
  the inner pipe element, the waste inlet and the solids outlet of the housing form parts of a conduit not in fluid communication with the annular space around the inner pipe element;
  wherein the inner pipe element is clamped within the housing via a cylinder-shaped resilient assembly arranged at at least one of the first open end and the second open end of the inner pipe element, the resilient assembly is adapted to allow longitudinal expansion of the inner pipe element and comprises a central through-going passage having a centerline in line with a centerline of the inner pipe element.

In other words, the resilient assembly is adapted to allow thermal longitudinal expansion of the inner pipe element during use, i.e. expansion of the inner pipe element in a direction parallel to the centerline of the inner pipe element.

In other words, by being clamped via the resilient assembly, the resilient assembly is in at least indirect contact with, i.e. operably connected to, the first open end and/or the second open end.

The resilient assembly may also be defined as being fluid-tight in a radial direction relative the conduit and arranged to form a part of the conduit between the first open end of the inner pipe element and the waste inlet, or between the second open end of the inner pipe element and the solids outlet.

The inner pipe element is clamped by compressive forces acting in the longitudinal direction of the pipe element.

The resilient assembly may be arranged to provide a fluid-tight connection with the first open end and form a part of the conduit. The resilient assembly is arranged to allow/absorb/take up a longitudinal expansion of the inner pipe element during use.

In an embodiment of the microwave pyrolysis reactor, the cylinder-shaped resilient assembly is arranged at the first open end of the inner pipe element.

In an embodiment of the microwave pyrolysis reactor, the resilient assembly comprises at least one spring element being compressible in a direction parallel to a centerline of the inner pipe element and a fluid-tight annular wall, the spring element having a first end and a second end. Preferably, the fluid-tight annular wall extends at least from the first end to the second end of the at least one spring element.

The spring element may comprise a seal ring arranged at each of the first and the second end. The spring element may comprise a seal ring arranged at at least one of the first and the second end.

In an embodiment of the microwave pyrolysis reactor, the spring element is cylindrical and comprises a central through-going passage having a centerline in line with a centerline of the inner pipe element.

The through-going passage may have a cross-section substantially equal to or larger than an inner cross section of the inner pipe element, i.e. an inner cross section of the part of the conduit formed by the inner pipe element.

In an embodiment of the microwave pyrolysis reactor, the spring element is arranged to provide an evenly distributed force to at least one of the first open end and the second open end of the inner pipe element.

In other words, the spring element is arranged to provide a force evenly distributed at the first and/or second open end, preferably evenly distributed to an annular surface of each of the first and/or second open end, the annular surface(s) in a plane perpendicular to a centerline of the inner pipe element.

In an embodiment of the microwave pyrolysis reactor, the spring element is made in a suitable metal, such as stainless steel.

In an embodiment of the microwave pyrolysis reactor, the spring element is bellows-shaped. Bellows-shaped is intended to mean a cylindrical spring element having an integrated fluid-tight annular wall and a through-going passage. Preferably, the spring element is a metal bellows.

In an embodiment of the microwave pyrolysis reactor, each of the first open end and the second open end of the inner pipe element comprises an annular surface arranged in a plane perpendicular to a centerline of the inner pipe element. Preferably, at least an inner annular section of the annular surface overlaps a transverse cross-section of the inner pipe element at a longitudinal position hallway between the first open end and the second open end, i.e. such that the compressive forces applied to the inner annular section is supported by the wall of the inner pipe element.

In an embodiment of the microwave pyrolysis reactor, each of the first open end and the second open end comprises a flared portion, alternatively a flanged portion, featuring the annular surface.

In an embodiment of the microwave pyrolysis reactor, the resilient assembly comprises a protective sleeve arranged at an internal side of the at least one spring element, preferably such that an internal volume of the inner pipe element and the conduit/flow path are not in fluid communication with the spring element. The protective sleeve is preferably arranged between a flow path of the conduit and the spring element (or the resilient assembly). The resilient assembly may be defined as comprising the protective sleeve In an embodiment of the microwave pyrolysis reactor, the resilient assembly forms a part of the conduit. In other words, the resilient assembly forms or constitutes a part of the conduit not in fluid communication with the annular space. In other words, the spring element, the fluid-tight annular wall and/or the protective sleeve forms a part of the conduit.

In an embodiment of the microwave pyrolysis reactor, the inner pipe element is substantially vertical and arranged with the first open end at a higher level than the second open end, such that a material entering the waste inlet during use is transported through the inner pipe element, from the first open end to the second open end, by gravity.

In an embodiment of the microwave pyrolysis reactor, the annular surface of the second open end faces an annular shoulder of (or within) the housing, such that the inner pipe element is clamped between the annular shoulder and the resilient assembly. A first seal ring may be arranged between the annular shoulder and the annular surface of the second open end of the inner pipe element to ensure a fluid tight connection.

In an embodiment of the microwave pyrolysis reactor, the resilient assembly is forced towards the annular surface of the first open end. A second seal ring may be arranged between the annular surface of the first open end of the inner pipe element and the resilient assembly to ensure a fluid tight connection.

In an embodiment of the microwave pyrolysis reactor, the housing comprises a flanged element arranged to clamp the resilient assembly between the flanged element and the first open end of the inner pipe element. A third seal ring may be arranged between the resilient assembly and the flanged element to ensure a fluid tight connection.

In an embodiment of the microwave pyrolysis reactor, the resilient assembly comprises at least one of the second or third seal ring, preferably arranged at the first and second end of the spring element, respectively.

In an embodiment of the microwave pyrolysis reactor, the protective sleeve comprises a flanged portion arranged between the flanged element and the spring element (or resilient assembly), the flanged portion may function as a seal ring to provide a fluid tight connection between the flanged element and the spring element.

In an embodiment, the microwave pyrolysis reactor comprises a collar element arranged at the first open end of the inner pipe element, the collar comprises an annular recess arranged to receive a lower edge of the protective sleeve.

In an embodiment, the microwave pyrolysis reactor comprises at least one seal ring arranged between the resilient assembly and any of the first or second open end of the inner pipe element, between the first or second open end of the inner pipe element and a shoulder of the housing and/or between the resilient assembly and the flanged element, the at least one seal ring is preferably made of metal or ceramic fibers, but seal rings in other suitable materials may also be used.

In an embodiment of the microwave pyrolysis reactor, the gas outlet is in fluid communication with the conduit, i.e. such that gas/volatiles may exit the reactor downstream the waste inlet.

In an embodiment of the microwave pyrolysis reactor, the gas outlet and the solids outlet are a common outlet arranged downstream the inner pipe element. In other words, the gas outlet and the solids outlet constitute a single outlet arranged downstream the inner pipe element. In other words, the common or single outlet for gas and solids is arranged on the opposite end of the waste inlet relative to the inner pipe element.

In an embodiment of the microwave pyrolysis reactor, the gas outlet and the solids outlet are separate outlets.

In an embodiment of the microwave pyrolysis reactor, gas outlet features a gas outlet pipe comprising a first open end arranged inside the housing and facing the first open end of the inner pipe element.

In one embodiment of the microwave pyrolysis reactor, the first open end of the gas outlet pipe is arranged at or above the level of the first open end of the inner pipe element. The first open end of the gas outlet pipe is preferably arranged above the level of the first open end. The first open end of the gas outlet pipe is preferably at a level above the first open end of the inner pipe element, such that a layer of waste material may be arranged between the first open end of the inner pipe element and the first open end of the gas outlet pipe, during use. The latter feature allows for a further improved filtration of the gas/volatiles produced in a pyrolysis process.

In one embodiment of the microwave pyrolysis reactor, a centerline of the inner pipe element intersects the first open end of the gas outlet pipe. In other words, the centerline of the inner pipe element intersects the horizontal cross-section of the first open end of the gas outlet pipe.

In one embodiment of the microwave pyrolysis reactor, the first open end of the gas outlet pipe is substantially centered around the centerline of the inner pipe element.

In one embodiment of the microwave pyrolysis reactor, the centerline of the inner pipe element intersects the center of the first open end of the gas outlet pipe.

In one embodiment of the microwave pyrolysis reactor, the first open end of the gas outlet pipe has a cross-sectional area being smaller than the first open end of the inner pipe element.

In one embodiment of the microwave pyrolysis reactor the waste inlet is arranged at a level above the first open end of the gas outlet pipe.

In one embodiment of the microwave pyrolysis reactor the waste inlet is arranged at a level above the first open end of the inner pipe element.

In one embodiment of the microwave pyrolysis reactor, the waste inlet is arranged at a level above the first open end of the gas outlet pipe and the housing comprises a second internal surface defining a circumferential space around the first open end of the gas outlet pipe. The waste inlet is preferably arranged at a level above the circumferential space.

In one embodiment of the microwave pyrolysis reactor, the gas outlet pipe comprises a vertical pipe section featuring the first open end. The circumferential space is arranged around at least parts of the vertical pipe.

In one embodiment of the microwave pyrolysis reactor, the waste inlet is in communication with the first open end of the inner pipe element via the circumferential space.

In one embodiment of the microwave pyrolysis reactor, the second internal surface of the housing is part of a vertical inlet pipe having an upper and lower opening, the waste inlet arranged at the upper opening and the lower opening facing the first open end of the inner pipe element. The gas outlet pipe comprising a vertical section and a horizontal section, wherein the vertical section comprises the first open end and the horizontal section extend through the wall of the vertical inlet pipe.

In one embodiment of the microwave pyrolysis reactor, a section of the housing comprising the first inner surface is double-walled, the double-walled section comprises an internal space within which cooling fluid may be circulated. The reactor comprises a cooling fluid inlet and a cooling fluid outlet in fluid communication with the internal space.

In one embodiment, the microwave pyrolysis reactor comprises a cylinder-shaped microwave distribution element arranged around the inner pipe element, the microwave distribution element is made of a material not transparent to microwaves and comprises at least one opening for allowing passage of microwaves from the port and into the inner pipe element.

In one embodiment, the microwave pyrolysis reactor comprises an inert gas inlet arranged to provide an inert gas into the annular space around the inner pipe element, during use.

In one embodiment of the microwave pyrolysis reactor, a second open end of the gas outlet pipe is connectable to a gas treatment system comprising a suction device, such that a below ambient pressure may be present at the first open end of the gas outlet pipe.

In one embodiment of the microwave pyrolysis reactor, the inert gas inlet is connectable to an inert gas source, such that an inert gas of at least ambient pressure may be present in the annular space during use.

In a second aspect, the present invention provides a waste treatment system comprising a microwave pyrolysis reactor according to any embodiment of the first aspect, a microwave source and a gas treatment system; wherein
    the microwave source is connected to the port by a microwave waveguide; and
    the gas treatment system is connected to the gas outlet or gas outlet pipe and comprises a suction device arranged such that the pressure at the first open end of the gas outlet pipe or at the gas outlet may be kept below ambient pressure during use.

In one embodiment, the waste treatment system comprises an arrangement for providing waste to the inlet of the reactor and an arrangement for removal of solids exiting the solids outlet of the reactor.

In one embodiment of the waste treatment system, a solids outlet chamber is connected to the solids outlet of the microwave pyrolysis reactor via at least one solids conveyor. The solids conveyor provides a fluid tight connection between the solids outlet and the solids outlet chamber. The at least one solids conveyor may optionally comprise a heat-exchange system for cooling the solids before entering the solids outlet chamber.

In a third aspect, the present invention provides for the use of a microwave pyrolysis reactor according to the first aspect, and/or the use of a waste treatment system according to the second aspect, for microwave-assisted pyrolysis of any material susceptible to heating by microwaves.

In an embodiment of the first aspect, the microwave pyrolysis reactor comprises a waste inlet assembly in communication with the waste inlet and arranged to provide a material to be pyrolyzed to the first open end of the inner pipe element in a gastight manner, and a solids outlet assembly in communication with the solids outlet and arranged to allow a material to exit the microwave pyrolysis reactor in a gastight manner. The term "gastight manner" is intended to mean that a material is transferred into and out of the pyrolysis reactor in a manner which prevents ambient gas, i.e. air/oxygen, from being sucked into the inner pipe element of the reactor.

In an embodiment of the first aspect, at least one of the waste inlet assembly and the solids outlet assembly comprises a waste inlet chamber and a solids outlet chamber, respectively.

In an embodiment of the first aspect, each of the waste inlet chamber and the solids outlet chamber comprises a first valve and a second valve for isolating the respective chamber. The first and the second valve are preferably gate valves, and even more preferred slide gate valves.

In an embodiment of the first aspect, each of the waste inlet chamber and the solids outlet chamber comprises a gas inlet and a gas outlet for inert gas purging of the respective chamber.

In an embodiment of the first aspect, the microwave pyrolysis reactor comprises a pressure sensor for monitoring the pressure within the annular space.

In an embodiment of the first aspect, the gas outlet or gas outlet pipe is connectable to a gas treatment system comprising a suction device, such that a below ambient pressure is present, or may be obtained, at the gas outlet or the first open end of the gas outlet pipe during use.

In an embodiment of the first aspect, the inert gas inlet is connectable to an inert gas source, such that an inert gas of at least ambient pressure is, or may be, present in the annular space during use.

The port for a microwave waveguide is arranged such that microwaves guided to the port from a microwave source is introduced into the annular space (i.e. the annular space of the first aspect or the first annular space of the fourth aspect).

In an embodiment of the first aspect, the gas outlet, or the first open end of the gas outlet pipe, is arranged upstream the first open end of the inner pipe element and downstream the waste inlet. In the present application, the term «upstream» refers to a position relative to the movement of a waste material to be pyrolyzed through the inner pipe element.

The waste inlet may be defined as being arranged upstream the first open end of the inner pipe element and the solids outlet may be defined as being downstream the second open end of the inner pipe element.

In an embodiment of the first aspect, the housing comprises multiple ports for a microwave waveguide.

In an embodiment of the first aspect, the microwave pyrolysis reactor comprises a microwave blocking section arranged between the inner pipe element and the port for a microwave waveguide, such that microwaves entering through the port, during use, are prevented from direct impact on the inner pipe element.

The microwave blocking section may be a plate element facing the port for a microwave waveguide and preferably having a cross-sectional area at least equal to the port for a microwave waveguide. Preferably, the cross-sectional area of the plate element is larger than the cross-sectional area of the port.

In an embodiment of the first aspect, a waste inlet chamber and a solids outlet chamber are connected to the waste inlet and the solids outlet, respectively, of the housing.

In an embodiment of the first aspect, microwave pyrolysis reactor features a microwave distribution element comprising a hollow cylindrical element comprising an external surface facing the inner surface of the housing, and an internal surface facing the inner pipe element.

In an embodiment of the first aspect, the at least one opening of the microwave distribution element is arranged such that microwaves may pass through the at least one opening and into the inner pipe element from at least two opposite radial directions of the microwave distribution element during use.

In an embodiment of the first aspect, the at least one opening is arranged such that there is no fully overlapping openings on diametric opposite sides of the microwave distribution element, preferably such that there is no overlap of openings on diametric opposite sides of the microwave distribution element.

In an embodiment of the first aspect, the at least one opening is at least one slot, preferably the at least one slot is shaped as at least a part of a helical shaped slot arrangement.

In an embodiment of the first aspect, the microwave distribution element comprises multiple openings.

In an embodiment of the first aspect, the microwave distribution element is arranged around the inner pipe element, such that a second annular space is provided between the inner pipe element and the microwave distribution element. In other words, in the first aspect of the invention, the annular space is separated into a first annular space and a second annular space.

The term "waste" is intended to comprise any type of material suitable for pyrolysis in a microwave pyrolysis reactor.

The term "vertical" used in connection with the inner pipe element refers to the direction of the centerline of the inner pipe element.

The terms "upstream" and "downstream" is relative the movement of the waste material stream from the first open end towards the second open end of the inner pipe element.

SHORT DESCRIPTION OF THE DRAWINGS

The present invention is described in detail by reference to the following drawings:

FIG. 4 is a cross-sectional view B-B of the microwave pyrolysis reactor in FIG. 2.

FIG. 5 is a top view of the microwave pyrolysis reactor in FIG. 1.

FIG. 6 is a sectional view A-A of the microwave pyrolysis reactor in FIG. 5.

FIG. 7 is a side view of the microwave pyrolysis reactor in FIG. 1.

FIG. 8 is a cross-sectional view C-C of the microwave pyrolysis reactor in FIG. 7.

FIG. 9 is an exploded side view of the main elements of the microwave pyrolysis reactor in FIG. 1.

DETAILED DESCRIPTION OF THE INVENTION

Figure 1:
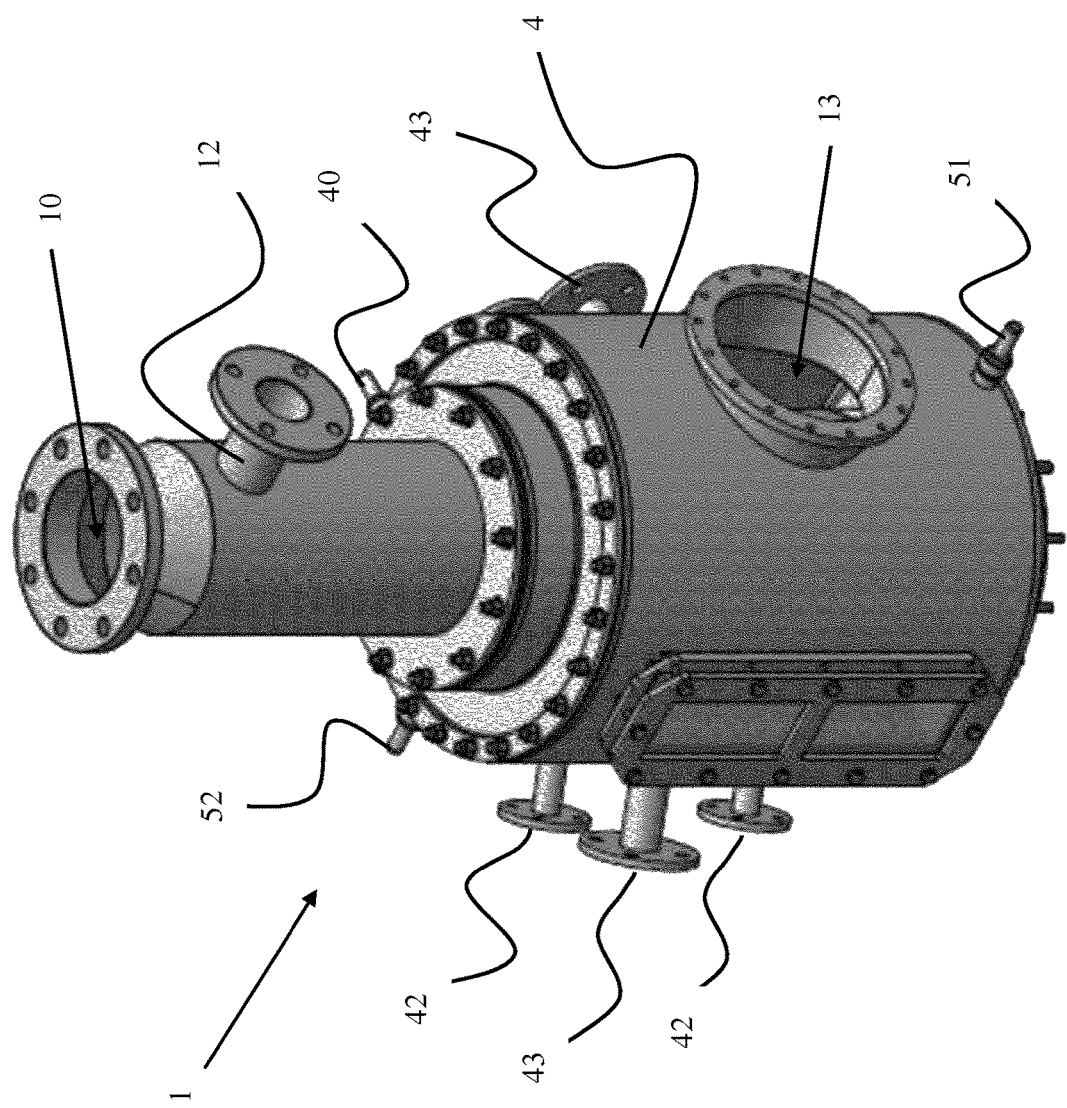
FIG. 1 is a perspective view of a first exemplary microwave pyrolysis reactor not being a part of the invention.
Figure 3:
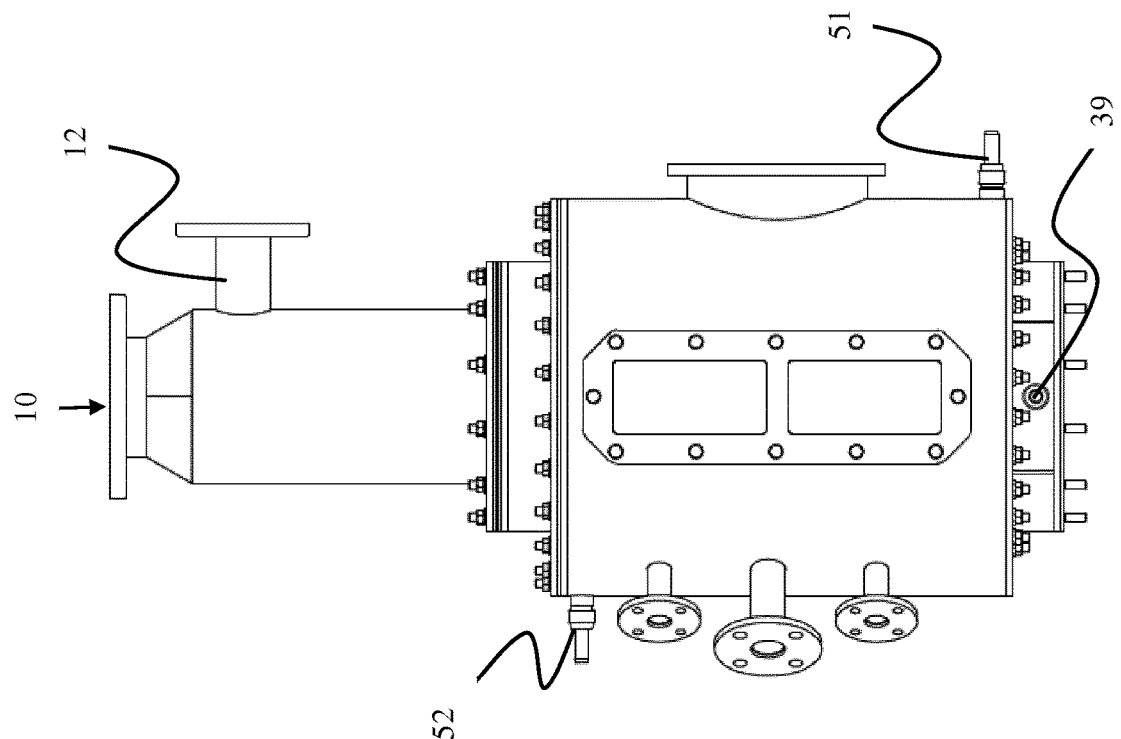
FIGS. 2 and 3 are side views of the microwave pyrolysis reactor in FIG. 1.
Figure 2:
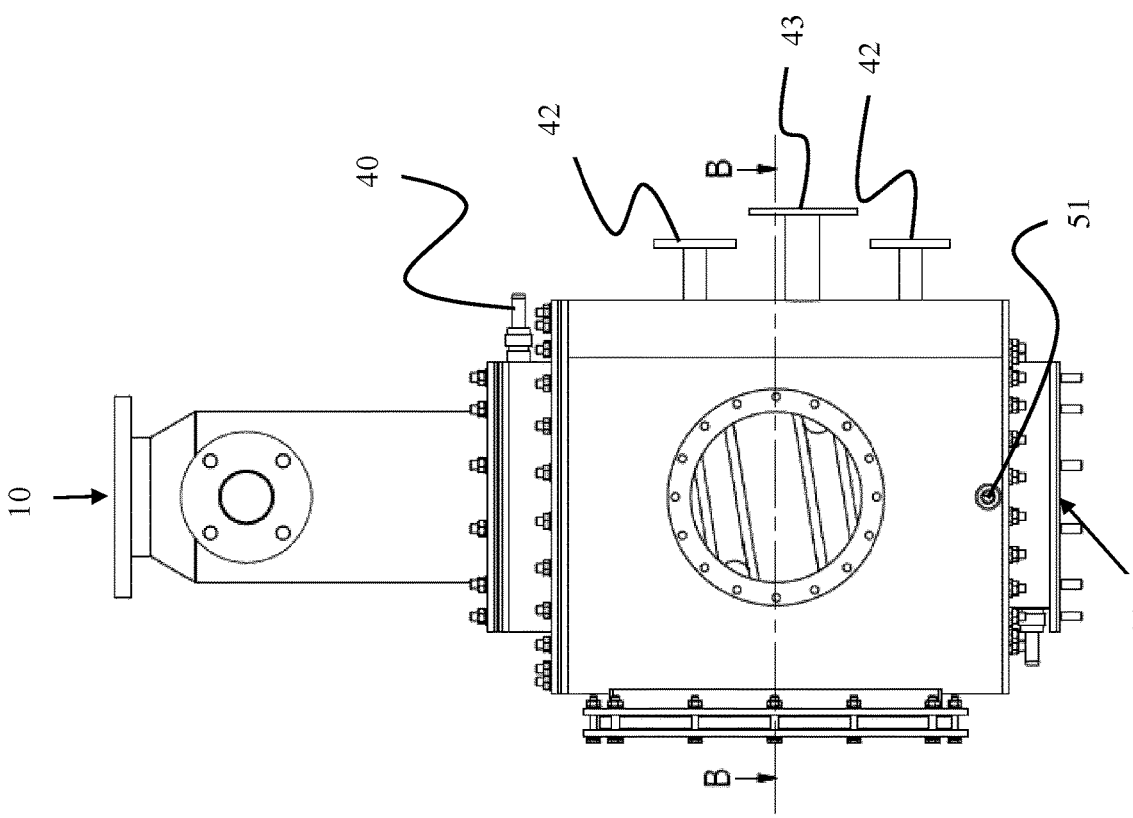

A first exemplary microwave pyrolysis reactor not being part of the invention is shown in FIGS. 1-9.

The reactor features an inner pipe element 2 made in a material that is transparent to microwaves and fluid-tight. The pipe element has an upper end 5 (i.e. a first open end) and a lower end 6 (i.e. a second open end), see FIG. 9. An outer pipe element 3 (i.e. a microwave distribution element) is arranged around and concentric to the inner pipe element 2, delimiting a first annular space 7 between the inner pipe element and the outer pipe element, see FIG. 4. The housing 4 of the reactor, more particularly a first inner surface of the housing, encloses a second annular space 44 (see FIG. 4) around the outer pipe element, and features a port 13 for connecting the second annular space to a microwave waveguide. The waveguide is for transferring microwaves from a suitable microwave source, such as a magnetron or solid-state generator. The port 13 comprises a window (not shown) made in a material that is transparent to microwaves. The window allows microwaves to enter the housing while preventing gas from exiting the first 7 and second annular space 44. The housing 4 features an inlet 10 (or waste inlet), a solids outlet 11, a gas outlet pipe 12 and an inert gas inlet 45 (see FIGS. 4 and 5). The inlet 10 and the solids outlet of the housing are arranged to communicate with the upper end 5 and the lower end 6 of the inner pipe element 2, respectively. The gas outlet pipe 12 comprises a first open end 38 (see FIGS. 6 and 8) arranged inside the housing 4 and facing the first open end 5 of the inner pipe element such that the gas developed in a pyrolysis process can escape/exit the reactor. The first open end 38 of the gas outlet pipe 12 is arranged above the level of the first open end 5 of the inner pipe element 2 and is substantially centered around the centerline C of the inner pipe element 2, see. FIG. 8. Having the first open end of the gas outlet pipe 12 arranged in this manner provides a highly advantageous increased and improved interaction between the produced gas and volatiles with the solid waste present within the reactor before the gas/volatiles are allowed to exit via the gas outlet pipe 12. The disclosed arrangement of the first open end of the gas outlet pipe is believed to be the optimum solution. However, an increased interaction of gas/volatiles and solids are also expected provided the centerline C of the inner pipe element intersects the first open end of the gas outlet pipe 12. The disclosed gas outlet arrangement guides the gas/volatiles rising through the solid waste in the inner pipe element towards the center of the inner pipe element, thus increasing the desired interaction between the volatiles and the solid waste.

A further advantage is also obtained by having the first open end of the gas outlet pipe 12 at a level above the upper end 5 of the inner pipe element. This arrangement allows an amount of non-pyrolyzed waste to be present between the upper end of the inner pipe element and the first open end of the gas outlet pipe. The amount of non-pyrolyzed waste provides an increased filtration of the produced gas/volatiles before entering the gas outlet pipe and improves the microwave absorption of the non-pyrolyzed waste before entering the inner pipe element to be pyrolyzed.

The increased and improved interaction between the solid waste and the gas/volatiles is advantageous for at least two reasons; it increases the microwave absorption of the solids since the solids absorb or filter off high-boiling volatiles (e.g. tar) and particles (e.g. char) from the gas/volatiles and in addition provides a more homogenous and pure gas/volatiles fraction.

The inlet 10 (i.e. waste inlet or solids inlet) of the housing 4 may be part of an assembly or housing section comprising a feed pipe 15 and the gas outlet pipe 12. The feed pipe 15 has a first end 16 and a second end 17, and the inlet 10 is arranged at the first end 16 of the feed pipe. The second end 17 faces the first open end 5 of the inner pipe element 2, such that a circumferential space 18 is formed between the feed pipe 15 and a vertical section of the gas outlet pipe 12 comprising the first open end 38. The feature of having the inlet in communication with the upper end 5 of the inner pipe element via the circumferential space 18 is highly advantageous since the circumferential space may function as a waste buffer ensuring an optimized waste feed to the inner pipe element.

The inert gas inlet 45, see FIGS. 4 and 5, is arranged to provide an inert gas (commonly nitrogen, but may also be any other suitable inert gas, such as carbon dioxide, argon, flue gas etc.) to the first and second annular space, i.e. the annular space between the first inner surface of the housing and the inner pipe element.

The inner pipe element 2 together with the inlet 10 and the solids outlet 11 of the housing 4 is part of a flow path/conduit 37 (see. FIG. 8) not in fluid communication with the annular space 7, 44 around the inner pipe element.

The wall of the outer pipe element features multiple slots 8 (i.e. openings) arranged in a helical configuration (i.e. a helical slot arrangement), see FIG. 9. During use, microwaves entering the reactor via the port 13 will enter the first annular space 7 between the inner pipe element and the outer pipe element via the slots. The effect of the outer pipe element is to provide a more even distribution of the microwaves impacting a waste material inside the inner pipe element. This in turn provides for a more homogenous heating of the material.

It is noted that although providing an advantageous effect, the microwave distribution element (i.e. the outer pipe element 3) is not essential for the functionality of the reactor. In embodiments of the reactor not comprising such a microwave distribution element, the housing delimits a single annular space between the inner pipe element and the housing (i.e. an inner surface of the housing). In the following, the combined first and second annular space, is commonly termed the annular space.

In use, the microwave pyrolysis reactor is arranged with the inner pipe element in a vertical direction having the inlet 10 of the housing and the upper end 5 of the inner pipe element arranged at a level above the solids outlet 11 of the housing and the lower end of the inner pipe element. This provides several advantages including the feature that a waste material to be pyrolyzed is passed through the reactor simply by use of gravity. Further, during pyrolysis, gaseous and/or volatile products (mainly hydrocarbon gas/vapors) formed in a lower part/level of the inner pipe element will rise through the inner pipe element and interact with the waste material situated at a higher level in the inner pipe, i.e. the less volatile components of the gas, as well as char particles guided upwards by the gas flow, will be absorbed by/onto the waste material. The gaseous products, as well as the char particles, have commonly a much higher microwave absorption capability than the waste material being closer to the inlet of the housing, and the resulting effect is consequently an increased microwave absorption in said waste material. The latter effect is highly advantageous since it allows for a more effective pyrolysis of the waste materials. This effect may even provide for the effective pyrolysis of materials that would otherwise require the addition of microwave absorbent additives, such as char, to obtain an effective pyrolysis. In addition to the increased microwave absorption, the interaction between the gaseous and/or volatile products and the waste material provides an efficient scrubbing/filtration of the gas before exiting via the gas outlet pipe 12. As discussed above, the disclosed arrangement of the first open end 38 of the gas outlet pipe 12 provides an optimal interaction between the gas/volatiles and the waste material.

As mentioned above, in this specific embodiment, the slots 8 of the microwave distribution element 3 are arranged in a helical configuration. However, a useful or suitable homogenizing effect on the microwave distribution may be obtained by other slot configurations. Further embodiments, wherein the slots are replaced by openings having various cross-sectional areas, such as circular, elliptic and polygonal are thus envisioned. A requisite is that the openings are dimensioned to allow passage of microwaves from the second annular space to the first annular space. Further, the openings are preferably arranged such that openings do not fully overlap on diametric opposite sides of the outer pipe element. By avoiding such overlap, most of the microwaves are reflected and distributed within the first annular space in the longitudinal direction of the inner pipe element.

The microwave pyrolysis reactor comprises multiple temperature sensors 42 and pressure sensors 43. The sensors themselves are not shown, and in the drawings the reference numbers 42/43 are used to identify the sensor mounts/ports for the respective sensors. The sensors monitor the temperature conditions in the reactor and the pressure in the first annular space 7 and the second annular space 44 (i.e. the pressure in the annular space between the inner pipe element and the first inner surface of the housing). When used in for instance a waste disposal system as described below, the various sensors are connected to a suitable control and monitoring system (not shown).

The outer pipe element 3 (i.e. the microwave distribution element) of the disclosed reactor comprises a first heat exchange system for removal of heat from within the microwave pyrolysis reactor during use. The first heat exchange system is not essential for a functional reactor but provides several advantageous effects. The heat exchange system features a helical fluid channel 41 arranged within the wall of the outer pipe element 3 (i.e. the fluid channel is arranged between an external and an internal surface of the microwave distribution element). The fluid channel is connected to fluid inlet 39 and a fluid outlet 40 for a heat exchange fluid. By having the fluid channel as an integral part of the helical design, the heat capacity of the heat exchange system may be increased without compromising the helical slot arrangement, which provides an excellent microwave distribution. However, the same advantage may be obtained when used in microwave distribution elements having other suitable arrangements of slots and/or openings. This feature is highly advantageous when the reactor is to be used in environments, wherein the temperature of the housing is not allowed to exceed certain temperature limits. Further, having a heat exchange system for removal of heat from within the pyrolysis reactor provides further advantages in that excess heat from the reactor may be utilized in various auxiliary systems, such as in preheating of water, power generation and similar. By having the heat exchange system arranged in heat conducting contact with the outer pipe element 3, the outer pipe element functions as a heat conductive element for the heat exchanger. That is, the outer pipe element functions in a manner similar to a heat transfer fin/baffle/plate as used in known heat transfer systems. In addition, the outer pipe element is arranged close to the inner pipe element, within which the heat is generated, and an optimum temperature difference/gradient and heat transfer are obtained. Depending on the desired pyrolysis conditions, e.g. temperature, the feature of having a heat exchange system for removal of heat from within the microwave pyrolysis reactor, at a position close to the inner pipe element, may provide an advantage in that differences in the thermal expansion of the inner pipe element and the housing are minimized. These differences may otherwise cause material stress on the inner pipe element, leakages between the inner pipe element and its connection to the housing etc. See the exemplary reactors below for a solution which minimizes potential problems caused by the thermal expansion.

The reactor comprises a second heat exchange system to further increase the energy recovery in a pyrolysis process, as well as obtaining a further lowering of the external temperature of the housing 4. The second heat exchange system is arranged in a section of the housing surrounding the annular space 7,44. The section of the housing is double-walled to provide an internal annular space 50. The annular space 50 is connected to an inlet 51 and an outlet 52 for a cooling fluid, such that the cooling fluid (e.g. water) may be circulated through the annular space.

Figure 10:
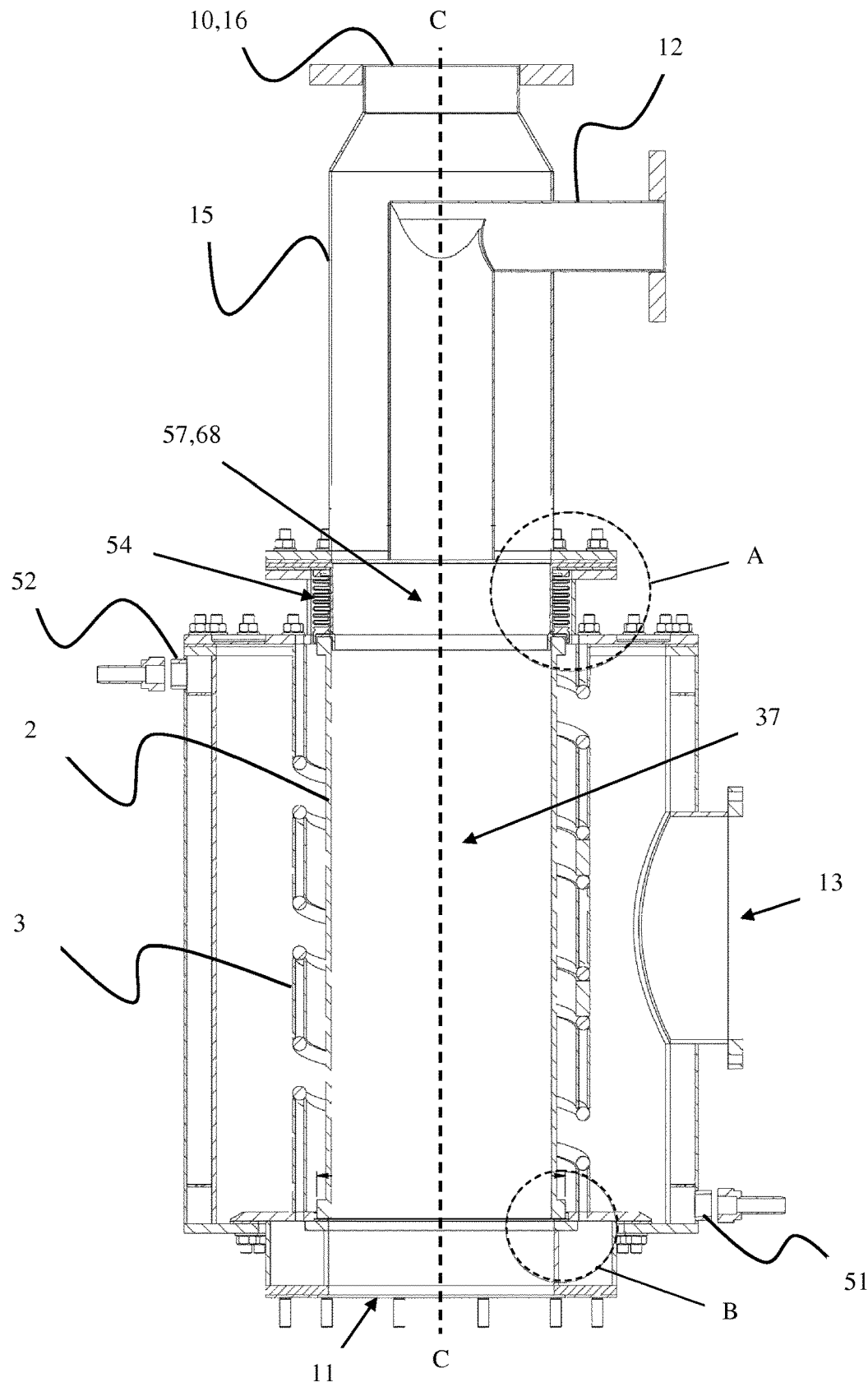
FIG. 10 is a cross-sectional side view of a second exemplary microwave pyrolysis reactor being a part of the invention.
Figure 11:
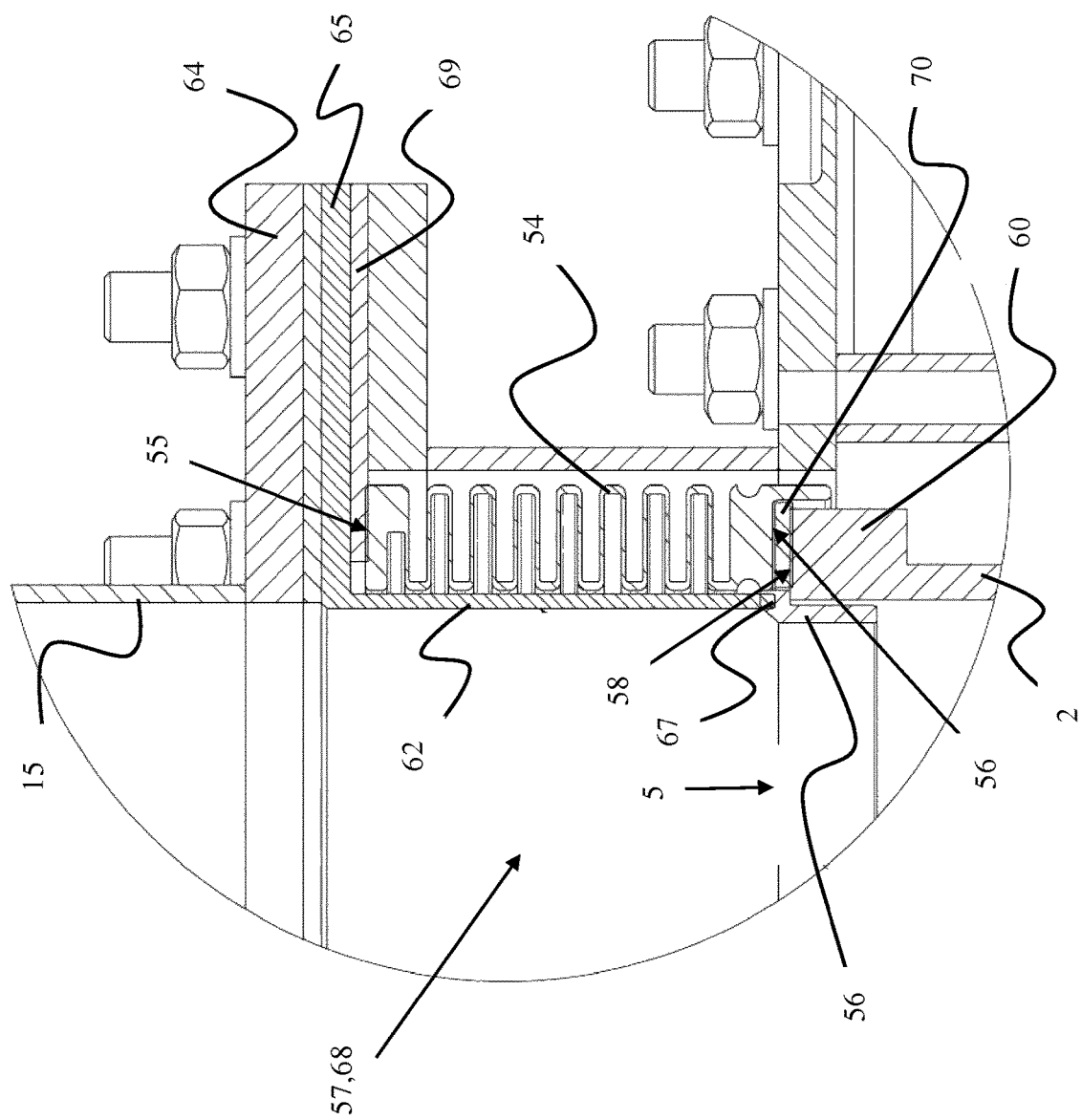
FIG. 11 is an enlarged view of detail A in FIG. 10.
Figure 12:
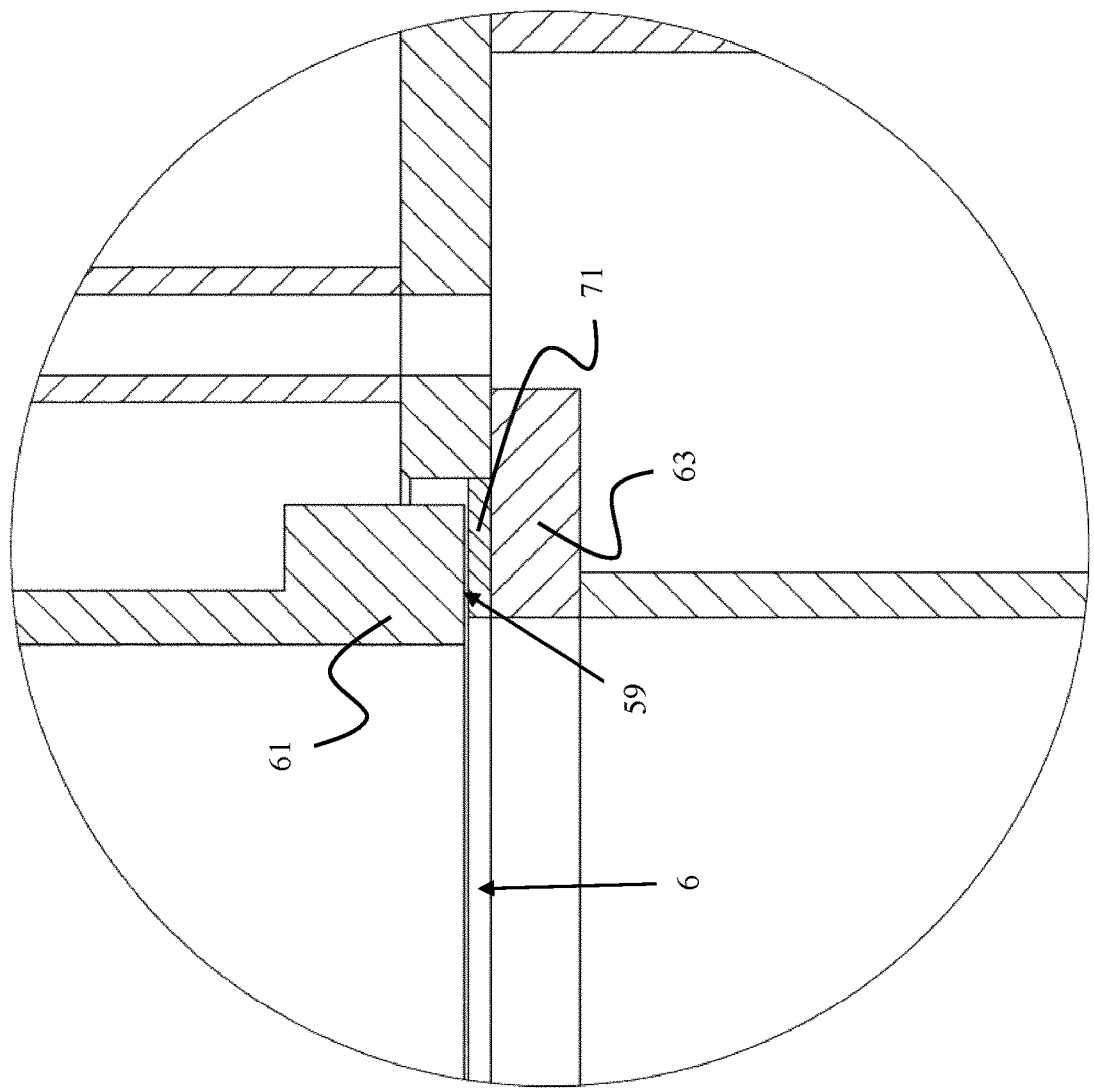
FIG. 12 is an enlarged view of detail B in FIG. 10.

A second exemplary microwave pyrolysis reactor being part of the invention is shown in FIGS. 10-12. During testing of the reactor described above by reference to FIGS. 1-9 it was discovered that the clamping/fastening of the inner pipe element inside the housing required a very precise application of force to avoid premature degradation of the inner pipe element 2, while at the same time ensuring a fluid tight connection despite potential thermal expansion/contraction of the reactor housing. This requirement is not ideal as small errors when clamping/fastening the inner pipe element may lead to a shortened operational lifetime of the inner pipe element and shorter service intervals. The premature degradation of the inner pipe element may be caused by an unevenly applied compressive force, an excessive compressive force, an increase in the compressive force due to the longitudinal expansion of the inner pipe element caused by the high temperature of the pyrolysis process and/or a combination of these factors.

To increase the operational life time of the inner pipe element, the second exemplary microwave pyrolysis reactor shown in FIGS. 10-12 provides a solution for clamping the inner pipe element within the housing, which avoids at least some of the factors mentioned above. The reactor is similar to the reactor in FIGS. 1-9 and similar or identical features are identified by the same reference numbers.

The main differentiating feature of the reactor in FIG. 10 in view of the reactor in FIGS. 1-9 is the presence of a resilient assembly comprising a metal bellows 54 (i.e. a spring element) arranged at the first open end 5 of the inner pipe element 2. The inner pipe element features flared portions 60,61 arranged at the first open end 5 and the second open end 6, respectively. Each flared portion features an annular surface 58,59 arranged in a plane perpendicular to the centerline of the inner pipe element. Via the annular surfaces 58,59, the inner pipe element 2 is clamped within the housing between the metal bellows 54, see FIG. 11, and a shoulder 63 arranged at the second open end 6 of the inner pipe element 2.

The metal bellows 54 is compressible in a direction parallel to the centerline C of the inner pipe element and has a first end 55, a second end 56 and a central through-going passage 68 having a centerline in line with the centerline C of the inner pipe element. By clamping the inner pipe element via the metal bellows (i.e. the resilient assembly) an even distribution of the compressive/clamping forces applied to the annular wall of the pipe is more easily obtained. Further, the longitudinal heat expansion of the inner pipe element which occurs during use is absorbed by the metal bellows and the increase in the compressive/ clamping forces resulting from the expansion is alleviated and potential degradation of the pipe element is minimized. It is also noted that the use of a resilient assembly to clamp the inner pipe element is advantageous in preventing leakage from the conduit/flow path 37 since the resilient clamping ensures an optimum contact between the annular surfaces of the inner pipe element and the metal bellows and the shoulder. Various seal rings 69, 70, 71 are used to ensure a fluid-tight connection between the inner pipe element 2, the metal bellows 54 and the housing. The seal rings 69,70 in contact with the metal bellows may be distinct seal rings or optionally form an integrated part of the metal bellows.

To prevent solids and tar from accumulating on the internal surface of the metal bellows, the reactor (or the resilient assembly) has a protective sleeve 62 arranged between the internal surface of the metal bellows and the flow path/conduit 37. The protective sleeve is mounted in a recess 67 of a collar 56 arranged at the first open end 5 of the inner pipe element and features a flanged portion 65 clamped between the first end 55 of the metal bellows and a flanged element 64. Preferably, the protective sleeve 62 is in a resilient material such that the sleeve does not contribute with a significant compressive force towards the first open end 5 of the inner pipe element.

The metal bellows 54 is arranged towards the annular surface 58 of the inner pipe element 2 by a bolted flange element 64. In this embodiment, the flange element 64 is a lower part of the feed pipe 15.

Figure 13:
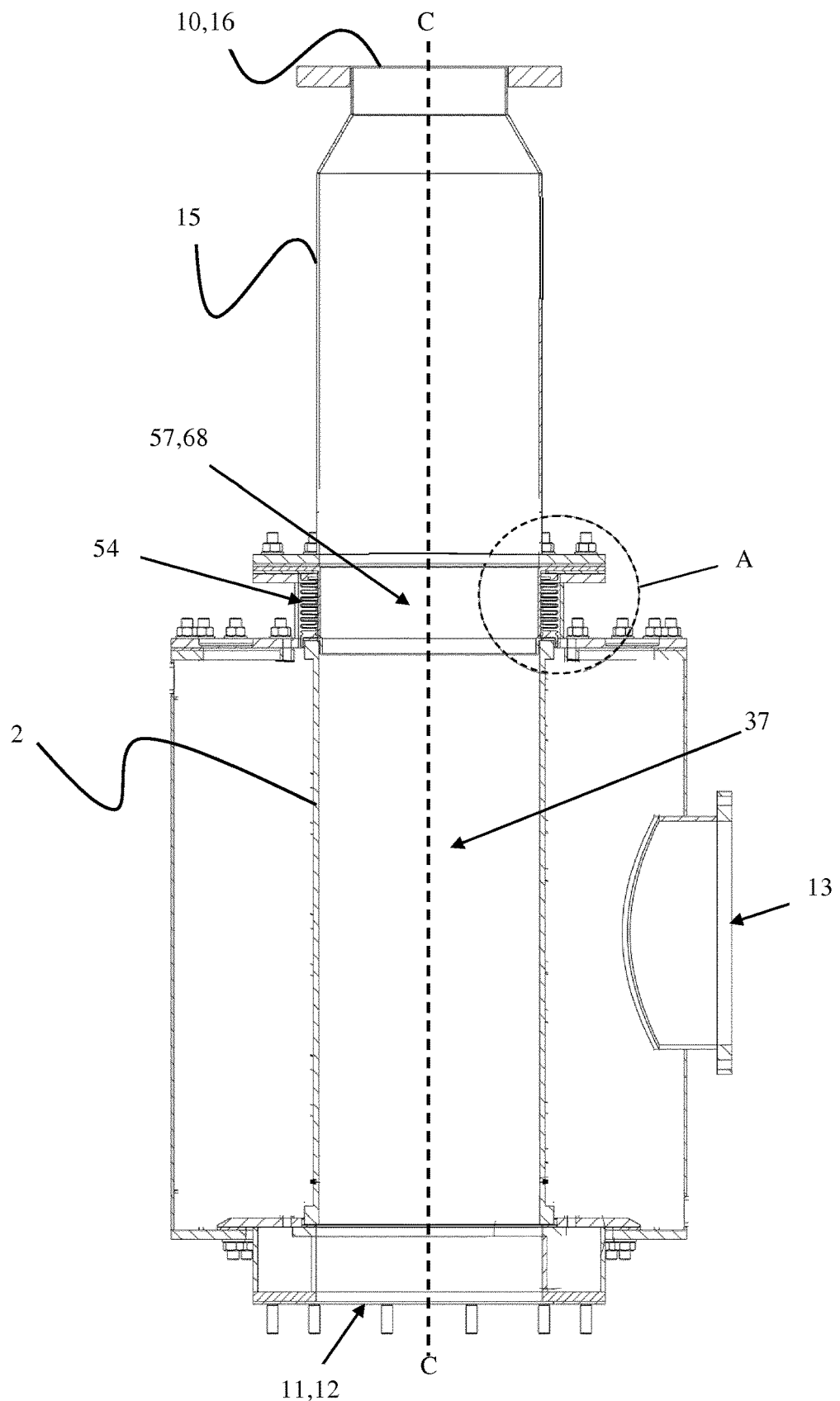
FIG. 13 is a cross-sectional side view of a third exemplary microwave pyrolysis reactor being a part of the invention.
Figure 14:
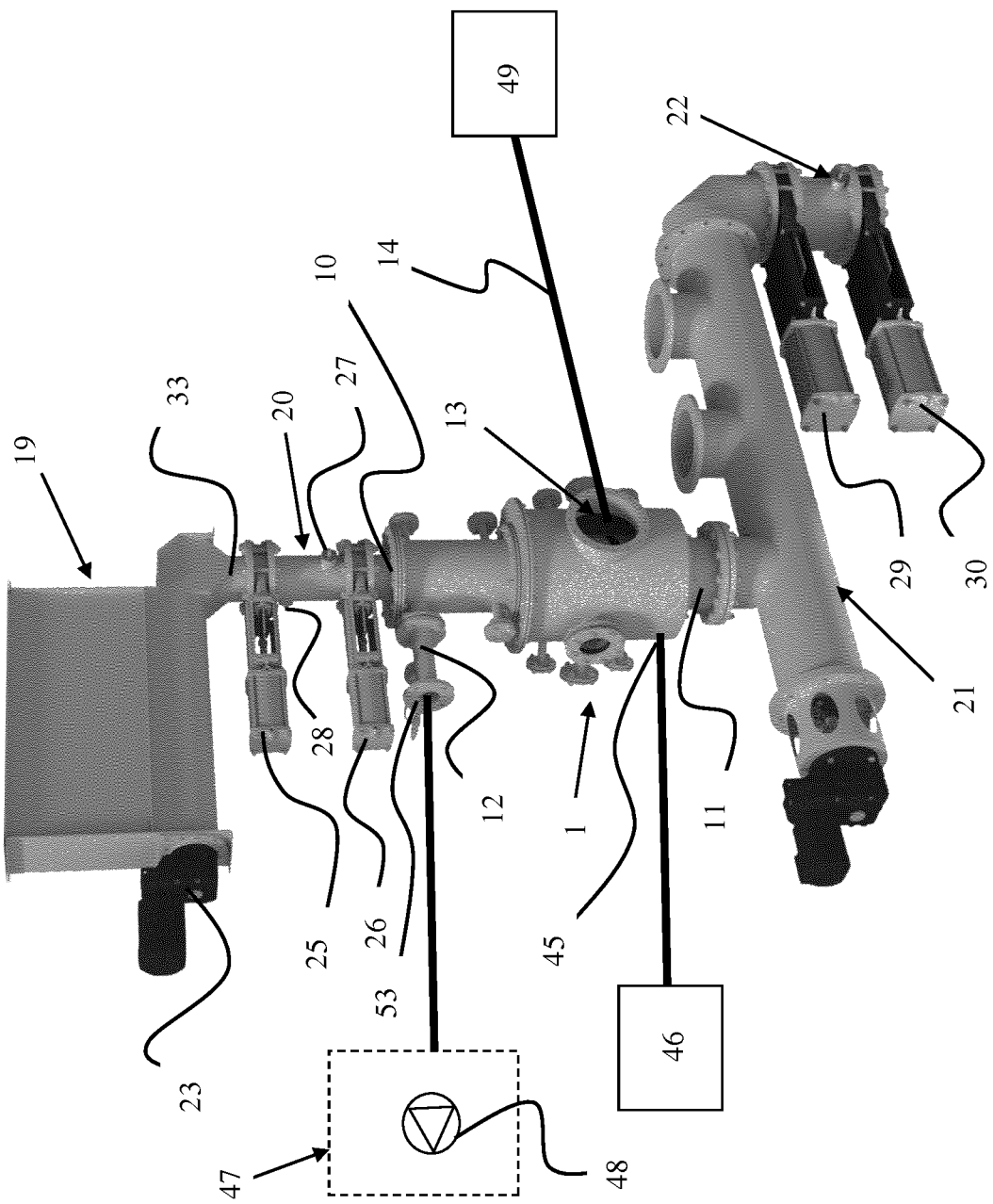
FIG. 14 is a perspective view of an exemplary waste disposal system featuring a microwave pyrolysis reactor according to the invention.

A third exemplary microwave pyrolysis reactor being part of the invention is shown in FIG. 13. The reactor comprises the same resilient assembly featuring a metal bellows 54 as described above, as well as an inert gas inlet (not shown) connected to the annular space between an inner surface of the housing and the inner pipe element 2. The distinguishing features of the reactor in FIG. 13, in view of the second exemplary reactor, are the removal of the separate gas outlet 12, the outer pipe element 3 and the second heat-exchange system. The gas outlet 12 and the solids outlet 11 of the third exemplary reactor are a common gas and solids outlet 11,12 arranged downstream of the inner pipe element 2.

In the disclosed embodiment, the resilient assembly features a single metal bellows to provide the required resilient clamping of the inner pipe element. In this specific embodiment, the metal bellows is obtained by turning of a steel pipe to obtain the required bellows shape. Metal bellows suitable for the present invention may be also obtained by any suitable method, such as welding and hydroforming and are commercially available from many sources (e.g. Comvac AG and Kompaflex AG). The use of a metal bellows is advantageous in that it provides a spring element having an integrated fluid-tight annular wall or surface providing an increased insurance against leakage from/into the conduit/flow path 37. However, based on the present disclosure the skilled person would easily conceive of other solutions for suitable resilient assemblies featuring a fluid-tight annular wall. Alternative assemblies may for instance include multiple annularly arranged spring elements (or a single annular spring) featuring a fluid-tight compressible sleeve, multiple spring elements (or a single annular spring) arranged in a compressible cylindrical fluid-tight housing and similar.

In the disclosed embodiment, the inner pipe element 2 of the exemplary pyrolysis reactors is arranged in a vertical direction because of the specific solution used for the waste inlet 10 and the gas outlet 12 and/or the ability to transport waste through the inner pipe element by gravity. However, the inventive solution for clamping the inner pipe element by use of a resilient assembly is also applicable to further embodiments of the microwave pyrolysis reactor, independent of whether the inner pipe element is vertical, horizontal or inclined, provided the waste inlet and the gas/solids outlet(s) are arranged such that waste may be introduced into the inner pipe element and the gas/solids outlet(s) are arranged such that gas/solids produced in the pyrolysis process is allowed to exit the inner pipe element. In case of a horizontal inner pipe element, the waste may for instance be transported through the inner pipe element by any suitable conveyor system (e.g. a screw). Various suitable solutions for transporting waste through a microwave pyrolysis reactor are well known in the art.

The main units/elements of an exemplary waste disposal system (alternatively waste treatment or processing system), featuring a microwave pyrolysis reactor 1 similar to the ones described above, is shown in FIG. 13. The reactor 1 in FIG. 13 differs from the reactors shown in FIGS. 1-12 in that the housing 4 and the outer pipe element 3 do not feature a heat exchange system.

In addition to the microwave pyrolysis reactor 1, the system comprises a waste container 19, a waste inlet chamber 20, a solids conveyor 21 and a solids outlet chamber 22. The waste container comprises a waste outlet 33 and have a screw conveyor 23 (the screw is not shown—only the motor connected to the screw) arranged to provide a waste material to the inlet 24 of the waste inlet chamber. The waste inlet chamber comprises an upper valve 25 (i.e. an inlet valve) and a lower valve 26 (i.e. an outlet valve). Both upper and lower valves are gate valves, but other suitable types of valves may be used. During a pyrolysis process, the internal volume of the inner pipe element is kept at a below ambient pressure, see description below. The valves are able to isolate the waste inlet chamber such that air/oxygen is prevented from being sucked into the reactor (i.e. into the inner pipe element 2) during feeding of the waste material. In this particular embodiment, oxygen may be purged from the waste material by use of nitrogen (i.e. an inert gas) before it enters the microwave pyrolysis reactor 1. The nitrogen is supplied via the gas inlet 27 and released via the gas outlet 28. However, although the nitrogen purging may be advantageous it is not a requirement since the amount of oxygen present within the isolated waste inlet chamber is small. The solids conveyor 21 is connected to the solids outlet of the microwave pyrolysis reactor and comprises an enclosed internal screw conveyor 34 (not shown). The screw conveyor 34 is arranged to transport the solids exiting the microwave pyrolysis reactor to the solids outlet chamber 22. Other means for transport of the solids in the solids conveyor, such as belts, may also be used.

The solids conveyor is dimensioned (i.e. have a length and/or circumference) such that the solids exiting the microwave pyrolysis reactor is allowed to cool sufficiently before they reach the solids outlet chamber. It is contemplated that the solids conveyor may comprise a heat exchange system for improving the cooling of the solids exiting the solids outlet 10. In addition to improving the cooling of the solids, such a heat exchange system may for instance be used to utilize the heat in various auxiliary systems, such as pre-heating of water.

The solids conveyor comprises temperature probes to monitor the temperature of the solids during transport from the solids outlet 11 to the solids outlet chamber 22. The solids outlet chamber 22 comprises an upper valve 29 (i.e. an inlet valve) and a lower valve 30 (i.e. an outlet valve). The valves are able to isolate the solids outlet chamber such that oxygen or air is prevented from being sucked into the solids conveyor (and consequently the inner pipe element of the microwave pyrolysis reactor). Similar to the waste inlet chamber, any oxygen in the solids outlet chamber may be purged by use of nitrogen via a gas inlet 31 and a gas outlet 32 (not shown), but this is not a requirement. The solids outlet 35 of the solids outlet chamber is commonly connected to a solids container 36 (not shown) for temporary storage of the solids.

In other embodiments, the inlet chamber 20 and the outlet chamber 22 may be arranged in other positions, such as having the outlet chamber arranged upstream the solids conveyor, the inlet chamber arranged upstream the waste container etc., provided the inlet chamber and the outlet chamber is able to prevent oxygen or air from being sucked into the inner pipe element 2 and the flow path/conduit 37 during the whole pyrolysis process, including the steps of feeding the waste material and emptying the solids.

Although considered to provide the most effective and durable solution for providing an isolatable/gastight inlet/outlet assembly, the described inlet/outlet chambers may alternatively be replaced by any suitable inlet/outlet assembly able to supply waste material into the reactor (or solids out of the reactor) without allowing air being sucked in due to the below ambient pressure in the inner pipe element. Such alternative assemblies are disclosed in for instance CN103923673A and WO 2013/077748A1, and are incorporated by reference.

The gas outlet pipe 12 (or a second open end 53 of the gas outlet pipe 12) of the microwave pyrolysis reactor is connected to a gas handling system 47 for processing and/or storage of the gaseous/volatile products formed in the reactor. The gas handling system comprises at least a suction device 48 (i.e. a gas fan/compressor/pump). The suction device 48 provides a below ambient pressure at the first open end 38 of the gas outlet pipe 12. Thus, most or all of the internal volume of the inner pipe element, as well as the internal volume of the reactor in direct fluid communication with the inner pipe element, is also kept at a pressure below ambient during use. The below ambient pressure provides a highly efficient transport of the gaseous products out of the microwave pyrolysis reactor, as well as ensuring an optimal flow pattern of the gaseous product through the waste material due to the positioning of the first open end 38 of the gas outlet pipe 12, as described above. The pressure at the first open end 38 may for instance be kept at about 5-15 mbar below ambient pressure. It is noted that in some circumstances, the pressure in the lowermost parts of the inner pipe element may reach above ambient pressure due to the gaseous products being formed and the increased flow resistance these products encounter towards the first open end 38 of the gas outlet pipe 12. However, this will not have an effect on the below discussed advantages of the reactor and system.

The below ambient pressure provided by the suction device 48 ensures that loss of mechanical/structural integrity of the inner pipe element 2, or any sealing elements separating the internal volume of the inner pipe from its surroundings (i.e. the annular space 7, 44) may easily be detected by monitoring the pressure within the annular space by use of the pressure sensors 43. Loss of mechanical/structural integrity may for instance be due to cracks in the inner pipe element or faulty sealing. The pressure sensors 43 communicate with a control system, such that the waste treatment system is shut down before any further damage may occur. The ability to efficiently detect loss of mechanical integrity and stopping the pyrolysis process is important, since air/oxygen sucked into the reactor may cause an explosive reaction with the gaseous products.

To remove any remaining risk of air/oxygen being mixed with the gaseous products during a loss of mechanical/structural integrity, the annular space is filled with an inert gas from an inert gas source 46 via the inert gas inlet 45. The inert gas (commonly nitrogen, but any suitable type of inert gas may be used) in the annular space is kept at minimum ambient pressure (or above), which pressure is monitored by the pressure sensors 43. The pressure of the inert gas may for instance be kept at about 5-15 mbar above ambient pressure. The ΔP of the pressure in the annular space and at the first open end 38 of the gas outlet pipe 12 may for instance be in the range of 10-30 mbar. If mechanical integrity is lost, as discussed above, only inert gas will be sucked into the inner pipe element or the flow path/conduit 37. The inert gas source 46 will provide inert gas to the annular space until the pyrolysis process is safely shut down.

The gas handling system 47 may in addition to the suction device 48, comprise any suitable device or system for condensing/separating at least part of the gaseous products into condensates and gas, storage systems for gas and condensates, systems for generating heat and/or electric power, such as a gas driven generator or an oil furnace. In one embodiment, the inert gas source 46 may be connected to one of the systems for generating heat and/or electric power, such that flue gas may be used as the inert gas.

In use, a waste material is first provided to the waste container 19. The waste container may for instance be connected to, or constitute a part of, a shredder, a pelletizer and/or waste storage hopper for providing waste material on a form suitable for introduction to the reactor. In a feeding sequence, the waste material, preferably a pelletized waste material, is transported to the outlet 33 of the waste container, the upper valve 25 of the waste inlet chamber is opened and the waste material introduced into the waste inlet chamber. After introduction, the upper valve 25 is closed and the waste inlet chamber 20 optionally purged by nitrogen (or any suitable inert gas) via the gas inlet 27 and the gas outlet 28. Subsequently, the lower valve 26 is opened and the waste material allowed to enter the microwave pyrolysis reactor via the upper inlet 10 due to gravity. The lower valve 26 is closed and the waste material is pyrolyzed by use of microwaves from a microwave waveguide 14 (shown schematically) connecting a microwave source to the port 13.

A level sensor (not shown) arranged in the reactor detects when a suitably low level of waste material is reached, and the above feeding sequence is repeated to provide a new batch of waste material to the reactor. Initially, the waste material in the inner pipe element 2 is at the same level of pyrolysis throughout the inner pipe element, however, after a certain time with repeated batches of introduced material, the material closest to the solids outlet 11 is fully pyrolyzed, i.e. is predominantly char, while the material closest to the inlet 10 is not.

Upon entering the microwave pyrolysis reactor through the port 13, the microwaves enter the annular space 7 and the inner pipe element via the slot(s) 8 and are distributed inside the inner pipe element 2. During pyrolysis, the waste material is mainly transformed to solids and gaseous/volatile material, wherein the solids consist predominantly of char and the gaseous material consists predominantly of hydrocarbon gas/vapors. Commonly, the pyrolysis is run within a temperature range of 300-600° C. The hydrocarbon gas/vapors are allowed to exit the reactor via the gas outlet pipe 12. When pyrolysis of at least a lower portion of the waste material, i.e. the portion closest to the solids outlet 11 of the reactor, is completed, the solids conveyor 21 moves the solids towards the solids outlet chamber 22. An advantage of having the inner pipe element arranged in a vertical direction is that any hydrocarbon gas/vapor developed in the process will pass through the waste material, which is between the position where the gas is developed and the first open end 38 of the gas outlet pipe 12.

When the solids outlet chamber 22 is full, the upper valve 29 is closed and the lower valve is opened, such that the solids can exit the solids outlet chamber. After exit of the solids, the lower valve 30 is closed, the solids outlet chamber optionally purged of oxygen, and the upper valve 29 opened to receive a new batch of solids. Commonly, the solids outlet chamber is connected to a solids container for intermediate storage of the solids.

Both the waste inlet chamber and the solids outlet chamber may optionally comprise an arrangement for evacuating gas/air out of the chamber, for instance a gas valve connected to a suction device. By combining the nitrogen purging with a prior evacuation of the chamber, the required amount of nitrogen gas may be reduced. In further embodiments, the waste inlet chamber and/or the solids outlet chamber do not comprise any features for purging or evacuation of air since the amount of oxygen able to enter the reactor via the inlet/outlet chambers is not sufficient to cause any adverse effect.

In an alternative embodiment, the waste treatment system comprises a reactor 1 as disclosed in FIGS. 1-9 or FIGS. 10-12, and the first and second heat exchange system of the reactor 1 is connected to any suitable auxiliary system for utilizing heat recovered from a pyrolysis process. The recovered heat may for instance be used in pre-heating of water, power generation, pre-drying of waste material and similar. In addition to the first and second heat exchange system, such an embodiment may also comprise a third heat exchange system connected to a solids conveyor 21 as discussed above.

In yet an embodiment, the waste treatment system may comprise a reactor 1 as disclosed in FIG. 13. In such an embodiment, the gas handling system 47 may for instance be connected to a gas outlet in the solids conveyor 21.

Suitable microwave transparent materials for use in the inner pipe element 1 include glass materials such as borosilicate or quartz, as well as various ceramics having low dielectric loss, such as boron nitride-based ceramics.

The use of microwaves to heat the material to be pyrolyzed entails that said material should preferably have certain intrinsic properties, i.e. having an electric dipole and a high ability to absorb microwaves at a wavelength $\lambda$ of between 12 cm and 32 cm. In many instances, the waste materials will be highly heterogenous, and not all will possess the required properties for effective microwave heating. In the latter case, despite the advantageous effect of having a vertical inner pipe element as discussed above, it may be required or advantageous to mix the waste material with an auxiliary material prior to introduction in the microwave pyrolysis reactor. Such auxiliary material may for instance be char previously produced in the microwave pyrolysis reactor. However, even if such auxiliary material is required, the vertical inner pipe element and its advantageous effect will minimize the amount of such material.

The disclosed microwave pyrolysis reactor is primarily described by its use in the disposal of waste materials, wherein the obtained products, e.g. char, oil and tar, are not the main goal of the pyrolysis process. However, the obtained products, as well as the heat energy produced in the process, are valuable and it is envisioned that the reactor and waste treatment system may be used in processes, wherein the obtained products and/or the produced heat energy are the main goal. Such processes may for instance be the production of biofuel by pyrolysis of wood-based raw materials, energy production and similar. Thus, the term waste treatment system is intended to also cover systems such as biofuel and power plants.

The invention claimed is:

1. A microwave pyrolysis reactor comprising an inner pipe element and a housing, wherein
   the inner pipe element is made of a microwave transparent material and is arranged within the housing and comprises a first open end and a second open end;
   the housing comprises a first inner surface, enclosing an annular space around the inner pipe element, a waste inlet, a solids outlet, a gas outlet, and a port for a microwave waveguide, the waste inlet and the solids outlet are in communication with the first open end and the second open end of the inner pipe element, respectively, the port for a microwave waveguide is in communication with the annular space;
   the inner pipe element, the waste inlet and the solids outlet form parts of a conduit not in fluid communication with the annular space around the inner pipe element and wherein the inner pipe element is clamped within the housing, by compressive forces acting in the longitudinal direction of the pipe element, via a cylinder-shaped resilient assembly arranged at at least one of the first open end and the second open end of the inner pipe element, the resilient assembly is adapted to allow longitudinal expansion of the inner pipe element and comprises a central through-going passage having a centerline collinear with a centerline of the inner pipe element, at least one spring element having a first end and a second end, and a fluid-tight annular wall, wherein the spring element is compressible in a direction parallel to a centerline of the inner pipe element.

2. A microwave pyrolysis reactor according to claim 1, wherein the spring element is cylindrical and comprises a central through-going passage having a centerline collinear with the centerline of the inner pipe element.

3. A microwave pyrolysis reactor according to claim 1, wherein the spring element is arranged to provide an evenly distributed force to at least one of the first open end and the second open end of the inner pipe element.

4. A microwave pyrolysis reactor according to claim 1, wherein the spring element is made of stainless steel.

5. A microwave pyrolysis reactor according claim 1, wherein the spring element is bellows-shaped.

6. A microwave pyrolysis reactor according to claim 1, wherein each of the first open end and the second open end of the inner pipe element comprises an annular surface arranged in a plane perpendicular to a centerline of the inner pipe element.

7. A microwave pyrolysis reactor according to claim 6, wherein each of the first open end and the second open end comprises a flared portion featuring the annular surface.

8. A microwave pyrolysis reactor according to claim 1, wherein a protective sleeve is arranged at an internal side of the at least one spring element, such that an internal volume of the inner pipe element is not in fluid communication with the spring element.

9. A microwave pyrolysis reactor according to claim 1, wherein the resilient assembly forms a part of the conduit.

10. A microwave pyrolysis reactor according to claim 1, wherein the gas outlet and the solids outlet are a common outlet arranged downstream the inner pipe element.

11. A microwave pyrolysis reactor according to claim 1, wherein the inner pipe element is substantially vertical and arranged with the first open end at a higher level than the second open end, such that a material entering the waste inlet during use is transported through the inner pipe element, from the first open end to the second open end, by gravity.

12. A microwave pyrolysis reactor according to claim 6, wherein the annular surface of the second open end faces an annular shoulder within the housing, such that the inner pipe element is clamped between the annular shoulder and the resilient assembly.

13. A microwave pyrolysis reactor according to claim 1, wherein the housing comprises a flanged element arranged to clamp the resilient assembly between the flanged element and the first open end of the inner pipe element.

* * * * *